United States Patent
Matsui et al.

(10) Patent No.: US 7,542,718 B2
(45) Date of Patent: Jun. 2, 2009

(54) WIRELESS COMMUNICATION TERMINAL AND WIRELESS COMMUNICATION METHOD

(75) Inventors: Yasunori Matsui, Kanagawa (JP); Katsutoshi Sakao, Kanagawa (JP); Hirokatsu Kimata, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/529,165

(22) PCT Filed: Sep. 11, 2003

(86) PCT No.: PCT/JP03/11659

§ 371 (c)(1), (2), (4) Date: Sep. 30, 2005

(87) PCT Pub. No.: WO2004/032377

PCT Pub. Date: Apr. 15, 2004

(65) Prior Publication Data

US 2006/0105765 A1    May 18, 2006

(30) Foreign Application Priority Data

Oct. 1, 2002    (JP)    ............................ P2002-288286

(51) Int. Cl.
*H04H 1/00*    (2006.01)
(52) U.S. Cl. ...................... 455/3.04; 455/3.01; 455/525; 455/517
(58) Field of Classification Search ................ 455/428, 455/436, 439, 456.3, 525, 452.1, 3.01, 3.04, 455/3.02, 3.06, 517, 502, 550.1, 524, 67.11, 455/503, 82
See application file for complete search history.

(56) References Cited

U.S. PATENT DOCUMENTS

| | | | | |
|---|---|---|---|---|
| 5,103,461 A | * | 4/1992 | Tymes | 375/141 |
| 5,568,654 A | * | 10/1996 | Fukawa | 455/456.3 |
| 5,668,803 A | * | 9/1997 | Tymes et al. | 370/312 |
| 6,272,341 B1 | * | 8/2001 | Threadgill et al. | 455/428 |
| 6,636,721 B2 | * | 10/2003 | Threadgill et al. | 455/12.1 |
| 6,741,841 B1 | * | 5/2004 | Mitchell | 455/188.1 |
| 7,031,665 B1 | * | 4/2006 | Trell | 455/70 |

(Continued)

FOREIGN PATENT DOCUMENTS

JP    08-168070    6/1996

(Continued)

*Primary Examiner*—John J Lee
(74) *Attorney, Agent, or Firm*—Lerner, David, Littenberg, Krumholz & Mentlik, LLP

(57) ABSTRACT

A wireless communication terminal is disclosed which has mass data such as stream data delivered thereto efficiently over a wireless communication network so that the overall utilization efficiency of the network is improved as well. While a wireless communication terminal (100) is receiving stream data for its use, a main controller (120) checks a radio wave reception level LB coming from a receiver unit (103) in the terminal. If the reception level is found to drop below a predetermined level, the main controller (100) causes a frequency synthesizer (105) to control reception frequencies fed to the receiver unit (103) so as to receive radio waves from a plurality of base stations in the vicinity. A search is thus made for a base station which offers a radio wave reception level higher than the predetermined level and which is delivering the stream data in question, and that base station is selected preferentially.

2 Claims, 4 Drawing Sheets

U.S. PATENT DOCUMENTS

2002/0106985 A1    8/2002    Sato et al.

FOREIGN PATENT DOCUMENTS

| JP | 10-308759 A | 11/1998 |
| JP | 2000-217157 | 8/2000 |
| JP | 2000-253180 A | 9/2000 |
| JP | 2001-128207 A | 5/2001 |
| JP | 2001-523422 | 11/2001 |
| JP | 2002-171548 A | 6/2002 |
| JP | 2002-521859 | 7/2002 |
| JP | 2003-051829 A | 2/2003 |
| WO | WO-00/04666 | 1/2000 |

* cited by examiner

WIRELESS COMMUNICATION TERMINAL AND WIRELESS COMMUNICATION METHOD

TECHNICAL FIELD

The present invention relates to a wireless communication terminal and a wireless communication method. The terminal is connected by the method to a wireless communication network over which stream data such as video and audio signals is distributed via base stations.

BACKGROUND ART

Recent advances in wireless LAN technologies are promoting the growing acceptance of what is known as Hot Spot Service (registered trademark) or similar service offerings designed to allow wireless communication terminals located in public places to acquire information over a network via wireless LAN base stations.

In a wireless LAN environment, a plurality of wireless communication terminals might be set up to obtain the same stream data such as videos and music. In such a case, the stream data generally furnished in large quantities is distributed by so-called IP multicast or like techniques.

The data handled by IP multicast is broadcast on a streaming basis within each wireless LAN cell. The stream data thus distributed is received by a plurality of mobile communication terminals. This setup is intended to reduce the amount of data flowing through each wireless segment of the network.

There already exist techniques (e.g., disclosed in Japanese Translations of PCT for Patent No. 2002-521589) for allocating channels for data distribution through IP multicast, and techniques (e.g., Japanese Patent Laid-open No. Hei 10-308759) for allowing audio-visual equipment in the household to acquire video and audio data from servers on a network through IP multicast. More applications using IP multicast are on their way.

In a wireless LAN environment, as mentioned above, the technique called IP multicast might be used to provide a stream data delivery service over a wireless communication network. In that case, each of the wireless LAN base stations making up the network typically has a limited range of coverage. That means a wireless communication terminal on the go needs to switch its connection from one wireless LAN base station (i.e., access point) to another so that the base station offering the best state of communication is always selected from the location of the terminal on the move.

Automatic selection of a base station by a terminal in transit is generally performed on the basis of the intensity of received radio waves (reception field intensity). The function of automatically selecting a base station relative to a mobile wireless communication terminal (i.e., automatic switching function) is called handover, hand-off, or roaming in its narrow sense.

Illustratively, as shown in FIG. 4, suppose that a base station 203 upon request from a plurality of wireless communication terminals 301 through 305 receives stream data Stm from a server 201 via a router 202 and broadcasts the received stream data Stm simultaneously to the terminals 301 through 305. The terminals 301 through 305 are located in a circular cell covered by the base station 203.

Suppose also that the wireless communication terminal 305 is leaving the cell of the base station 203 delivering the stream data Stm acquired through the router 202, to enter the cell of another base station 204 as shown in FIG. 4. In such a case, the wireless communication terminal 305 switches communication channels to establish communication with the base station 204 that offers a higher level of radio reception than any other base station in the vicinity.

If there is no other wireless communication terminal receiving the stream data Stm in question within the cell of the base station 204, the base station 204 upon request by the wireless communication terminal 305 proceeds to establish a flow of the stream data as indicated by broken lines in FIG. 4.

When the wireless communication terminal getting delivery of the stream data from one base station moves into the cell of another base station, the new base station may or may not be currently offering delivery of the stream data. If the newly reached base station does not currently provide the stream data, it is necessary to establish a new flow of the stream data from the server to that base station and from there to the moving terminal. If that is often the case, the availability of the network as a whole could suffer significantly.

The present invention has been made in view of the above circumstances and provides a wireless communication terminal and a wireless communication method, whereby large quantities of data such as stream data (mass data) are delivered on a wireless communication network with a high degree of overall utilization efficiently.

DISCLOSURE OF INVENTION

In carrying out the invention and according to one aspect thereof, there is provided a wireless communication terminal comprising:

selecting means for selecting a base station with which to communicate;

detecting means for detecting a radio wave reception level of the base station selected by the selecting means;

determining means for determining whether the base station selected by the selecting means is delivering predetermined data;

switchover controlling means which, if the detected radio wave reception level from the detecting means drops below a predetermined level, then causes the selecting means to switch to other base stations consecutively for communication while checking each base station selected for the radio wave reception level thereof and for availability of the predetermined data to be delivered therefrom; and selection controlling means which, if the detected radio wave reception level from the detecting means drops below the predetermined level during reception of the predetermined data, then causes the selecting means preferentially to select a base station which is delivering the predetermined data and which offers a radio wave reception level higher than the predetermined level, based on the radio wave reception level of each base station selected and on the availability of the predetermined data to be delivered therefrom.

Where the wireless communication terminal according to one aspect of the invention is used to receive predetermined data delivered via a base station, the radio wave reception level from that base station is monitored during the data delivery. If the reception level is found to drop below a predetermined level, the switchover controlling means causes the selecting means to scan receivable base stations in the vicinity for reception levels of radio waves coming therefrom and for availability of the predetermined to be delivered thereby.

Based on the results of the scan, the switchover controlling means causes the selecting means preferentially to select a base station which is delivering the predetermined data being received by the terminal in question and which offers a radio wave reception level higher than the predetermined level.

That is to say, a choice is made between two base stations: one which is delivering the predetermined data and which offers a radio wave reception level higher than the predetermined level, and any other base station which provides a radio wave reception level higher than the predetermined level but which currently is not delivering the predetermined data; the former base station is selected preferentially.

The arrangements above appreciably reduce occasions for newly establishing flows of data being delivered over the wireless communication network, so that the overall utilization efficiency of the network is improved. At the same time, terminals on the move are assured of stable delivery of the desired data over the network.

In one preferred structure of the wireless communication terminal according to one aspect of the invention, the predetermined data may include at least any of video and audio data and other mass data being delivered continuously via the base stations.

For the preferred structure above, the data being delivered may be video and/or audio data distributed on a streaming basis for real-time reproduction, and/or mass data made up of text data as well as large quantities of numeric data such as mesh data for use in real-time weather forecast.

The above structure ensures stable delivery of the mass data that constitutes movies, music, and other content, data for real-time weather forecasts, text-based news, and other information offerings without reducing the utilization efficiency of the wireless communication network over which the information is distributed.

BEST MODE FOR CARRYING OUT THE INVENTION

Preferred embodiments of a wireless communication terminal and a wireless communication method according to the invention will now be described with reference to the accompanying drawings. The description that follows will focus on a wireless communication terminal connectable to a wireless communication network that is built by wireless LAN technology for delivery of stream data such as videos and voices by way of base stations (i.e., access points).

[Overview of the Wireless Communication Network]

Figure 1:
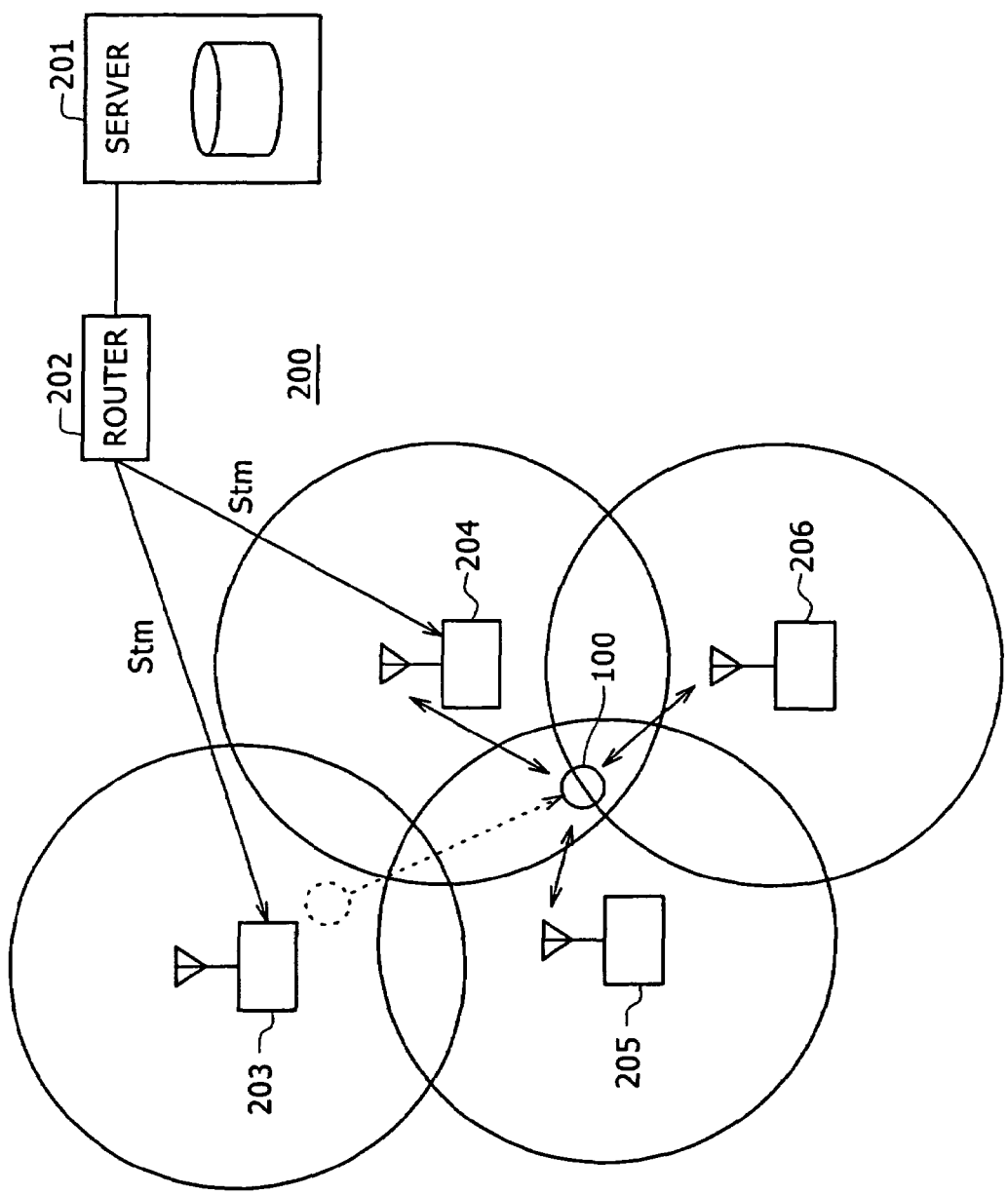
FIG. 1 is an explanatory view of a wireless communication network on which a wireless communication terminal embodying this invention is used.

FIG. 1 is an explanatory view of a wireless communication network 200 to which a wireless communication terminal embodying this invention can be connected. As shown in FIG. 1, the wireless communication network 200 includes a server 201, a router 202, and base stations 203, 204, 205, 206, etc. The server 201 set up on a suitable network such as the Internal delivers stream data Stm including video and audio data to a plurality of wireless communication terminals via the router 202 and the base stations 203, 204, etc., each base station being so established as to cover a predetermined geographical area. The data Stm delivered on a streaming basis is reproduced in real time by the terminals having received the data.

In FIG. 1, a circle around each base station indicates a cell formed by that base station. Each cell corresponds substantially to a geographical range in which wireless communication terminals in the vicinity of a given base station can communicate satisfactorily with that base station. The cells provided by the base stations overlap with one another so that any terminal on the move may leave one cell to enter another without interrupting the ongoing communication.

Over the wireless communication network 200 of the above-described setup, stream data is not delivered unconditionally through all base stations belonging to the network 200. Each wireless communication terminal 100 connectable to the wireless communication network 200 needs to output a stream data delivery request containing identification information (ID) about the desired stream data.

Upon receipt of the stream data delivery request, the base station checks to see if it is currently delivering the requested stream data. If the base station does not currently handle the request data, the base station forwards the request to an upstream device. In turn, the requested stream data is sent via the router 202 on the wireless communication network 200 to the base station in whose cell the requesting wireless communication terminal is located, whereby a new flow of the requested stream data is established.

Thereafter, the base station having newly received the requested stream data broadcasts the data simultaneously to a plurality of wireless communication terminals including the requesting terminal located within the cell of the base station.

That is to say, the base station in whose cell no wireless communication terminal exists to receive stream data will not distribute the stream data wastefully. It might happen that a wireless communication terminal currently receiving the stream data from one base station moves into the cell of another base station already distributing the stream data in question. In such a case, a handover of the terminal to the new cell is effected smoothly.

It might also happen that a wireless communication terminal within the cell of a base station currently distributing stream data makes a new request to deliver the stream data in question from the base station. In that case, with the requested stream data being distributed already, there is no need for the base station to establish the stream data flow anew. The wireless communication terminal need only request the delivery of the desired stream data, and the data is delivered without delay.

As described, stream data basically is not distributed via any base station in whose cell there is no wireless communication terminal using the stream data in question. Because stream data is broadcast by the base station, any specific flow of data need not be established between the base station and each particular wireless communication terminal. That means the overall utilization efficiency of the wireless communication network 200 will not be affected significantly.

FIG. 1 shows how the base stations 203 and 204 operate upon request from the wireless communication terminal located within the cell of each base station. Given the request, each of the base stations 203 and 204 is shown acquiring the stream data Stm from the server 201 via the router 202 before broadcasting the data to the wireless communication terminals.

The stream data Stm may be constituted illustratively by audio and video content such as TV programs and movies composed of moving pictures and sounds; by audio content made up solely of sounds including pieces of music, narrations, and news; and by composite content including the foregoing content plus still pictures and text data.

The wireless communication terminal 100 connectable to the wireless communication network 200 in the above-described setup receives for local use the stream data from the nearest base station. That is to say, the wireless communication terminal 100, as will be described later in more detail, receives video and audio data delivered as stream data so as to display or output videos and sounds representative of the received data.

Suppose now that the wireless communication terminal 100 inside the cell of the base station 203 broadcasting the stream data Stm moves, as indicated by broken lines in FIG. 1, into a location where it is possible to receive radio waves from the base stations 204, 205, and 206. In that case, the shorter the arrowed line between a given base station and the wireless communication terminal 100 in FIG. 1, the higher the radio wave reception level and the better the communication state (communication quality).

In the case above, the wireless communication terminal 100 is conventionally switched (i.e., handed over) from the communication channel of the base station 203 to that of the base station 205 that provides the highest radio wave reception level and the best communication state.

However, the base station 205 is not currently delivering the stream data Stm. It follows that once the base station 205 is selected for connection with the wireless communication terminal 100, it is necessary for the base station 205 to newly establish a flow of the stream data Stm. This can worsen the utilization efficiency of the wireless communication network 200.

By contrast, the inventive wireless communication terminal 100 moving from one cell to another while getting the stream data switches to the communication channel of a base station which is transmitting radio waves at a properly receivable level and which is already distributing the stream data in question.

In other words, the wireless communication terminal 100 receiving the stream data while on the move does not simply select the communication channel of the base station transmitting radio waves at the highest reception level. The wireless communication terminal 100 also selects the base station by taking into consideration the radio wave reception level offered by the station and the availability of delivery of the stream data from that station.

[Wireless Communication Terminal]

Figure 2:
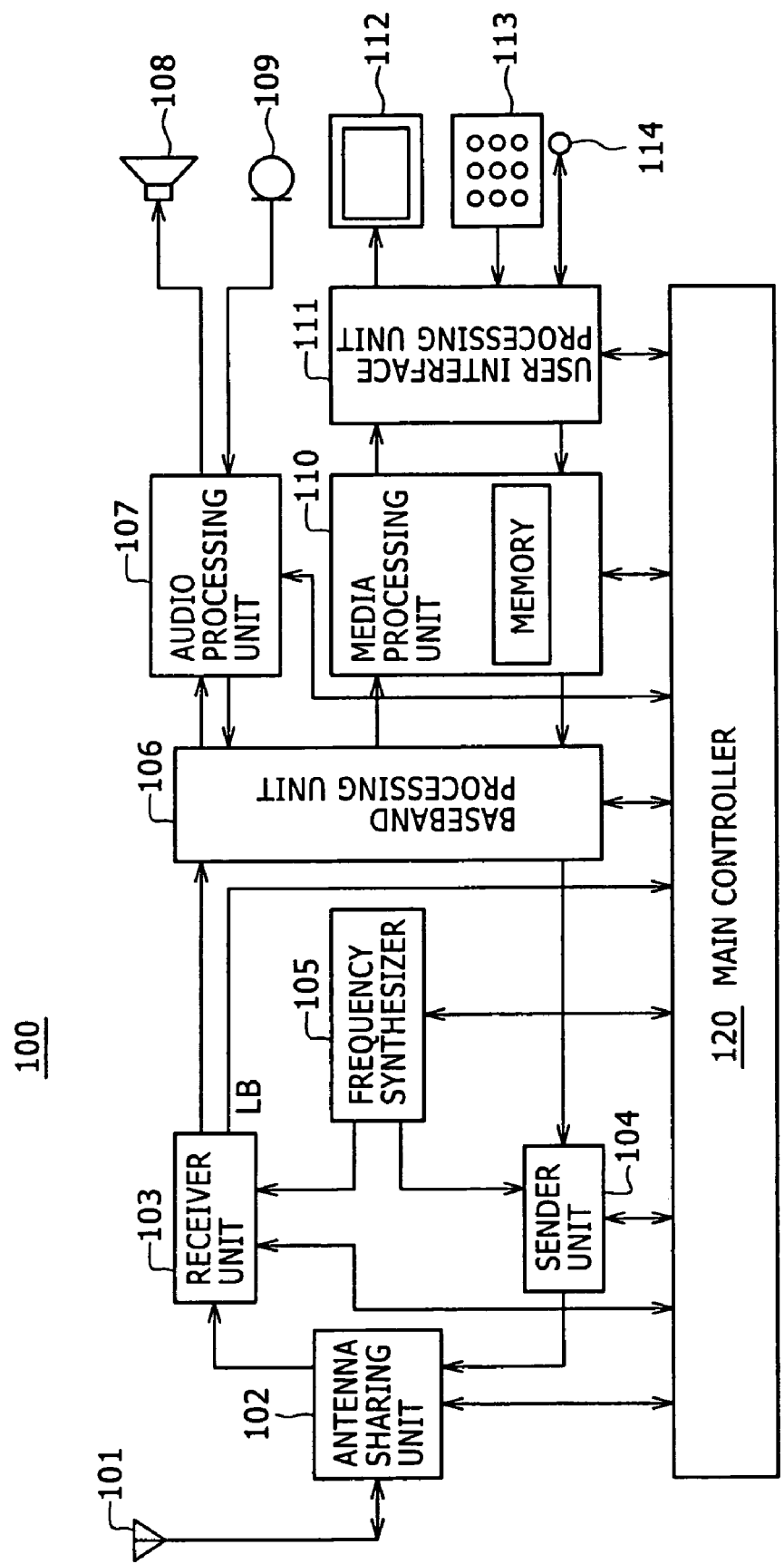
FIG. 2 is a block diagram of the wireless communication terminal embodying the invention.

What follows is a description of the wireless communication terminal 100 of this invention operating by the wireless communication method according to the invention. FIG. 2 is a block diagram outlining the inventive wireless communication terminal 100.

As shown in FIG. 2, the wireless communication terminal 100 includes: an antenna 101, an antenna sharing unit 102, a receiver unit 103, a sender unit 104, a frequency synthesizer (local oscillator) 105, a baseband processing unit 106, an audio processing unit 107, a speaker 108, a microphone 109, a media processing unit 110, a user interface processing unit 111, a display unit 112, an input unit (key pad) 113, an input/output terminal 114, and a main controller 120.

The media processing unit 110 is a microcomputer that includes a CPU (Central Processing Unit), not shown, for processing diverse kinds of media data such as stream data, and a memory unit made up of a RAM (Random Access Memory) used as a work area and a ROM (Read Only Memory) for storing the programs and data necessary for processing. The main controller 120 is also a microcomputer that includes a CPU, a ROM, and a RAM, not shown.

[Operation of the Receiver Block]

Described below are the workings of the receiver block in the wireless communication terminal 100 shown in FIG. 2. Signals received by the antenna 101 are sent to the receiver unit 103 via the antenna sharing unit 102. The receiver unit 103 selects the signal whose frequency corresponds to that which is specified by the frequency synthesizer 105, demodulates the selected signal, and feeds the resulting signal to the baseband processing unit 106.

The baseband processing unit 106 converts the signal coming from the receiver unit 103 into a digital signal, and decodes the digital signal according to the coding system specific to the signal, thereby restoring the original digital data in effect before the signal was coded. The baseband processing unit 106 then separates the data into three portions: control data and notification data to be sent to the main controller 120, data such as stream data to be fed to the media processing unit 110, and voice data to be supplied to the audio processing unit 107. The separated data portions are forwarded to their respective destinations.

The audio processing unit 107 converts to an analog signal the voice data in digital form coming from the baseband processing unit 106, and amplifies or otherwise processes the converted signal for output to the speaker 108. In turn, the voice of the communicating party is output by the speaker 108.

The media processing unit 110 separates the data coming from the baseband processing unit 106 into video data, audio data, control data, and others. From the video data, the media processing unit 110 generals a video signal destined for the display unit 112. The video signal is supplied to the display unit 112 through the user interface processing unit 111. In turn, the image represented by the received video data appears on a display screen of the display unit 112.

From the separated audio data, the media processing unit 110 generates an audio signal destined for speakers, not shown, or for headphones connected to a headphone terminal, not shown. The audio signal thus generated is supplied via the user interface processing unit 111 to the speakers or to the headphones through the headphone terminal. In turn, the sound represented by the received audio data is output by the connected speakers or headphones.

The video and audio data provided as the stream data is processed by the wireless communication terminal 100 as described above for reproduction and output. What is reproduced and output is enjoyed by the user of the wireless communication terminal 100.

Where the data fed from the baseband processing unit 106 to the media processing unit 110 is made up of control information and programs, the data is written to the RAM in the memory unit. From the memory unit, the data is read out as needed for use. Large quantities of data transmitted to the terminal may also be recorded via the user interface processing unit 111 and the input/output terminal 114 to a recording medium in a storage device attached to the input/output terminal 114.

[Operation of the Sender Block]

The workings of the sender block in the terminal will now be described. Sounds picked up by the microphone 109 are converted to an electrical signal that is sent to the audio processing unit 107. The audio processing unit 107 converts the audio signal coming from the microphone 109 into a digital signal that is forwarded to the baseband processing unit 106. The baseband processing unit 106 compresses the received audio signal by a suitable coding method and supplies the compressed signal to the sender unit 104.

The sender unit 104 modulates the supplied signal by an appropriate modulation method and converts the modulated signal to an analog signal of a predetermined frequency as designated by the frequency synthesizer. The sender unit 104 then amplifies or otherwise processes the analog signal so as to generate an outgoing signal. The outgoing signal thus generated is fed through the antenna sharing unit 102 to the antenna 101 from which the signal is transmitted (i.e., emitted).

A terminal ID of the wireless communication terminal on the other end of the connection and text data coming therefrom may be input through the input unit 113. Furthermore, data may be supplied for an externally connected storage device through the input/output terminal 114. Such ID information, text data, and supplied data are all sent to the media processing unit 110 via the user interface processing unit 111.

The media processing unit 110 turns the data coming from the user interface processing unit 111 into outgoing data of a predetermined communication format. The outgoing data thus generated is forwarded to the baseband processing unit 106.

The baseband processing unit 106 encodes the supplied data in the manner described above and sends the encoded data to the sender unit 104. The sender unit 104 modulates the supplied data as described above, converts the modulated data into an analog signal of a predetermine frequency as specified by the frequency synthesizer, and amplifies or otherwise processes the analog signal to form an outgoing signal. The outgoing signal thus generated is sent through the antenna sharing unit 102 to the antenna 101 from which the signal is transmitted.

The sender and the receiver blocks in the terminal operate as described above. The terminal may send out a stream data delivery request as explained with reference to FIG. 1 to get the stream data, which is held in an appropriate server on the Internet, delivered to the terminal for local use.

The wireless communication terminal may receive a communication request from another wireless communication terminal and communicate as requested with the requesting terminal. Conversely, the wireless communication terminal may send a communication request to a desired wireless communication terminal to communicate with that terminal.

[Execution of the Hand-over (Hand-off) Function]

In the wireless communication terminal 100 shown in FIG. 2, the receiver unit 103 detects in a suitably timed manner the radio wave reception level LB of the signal being received, selected, and demodulated. The detected radio wave reception level LB is fed to the main controller 120. The main controller 120 continuously monitors the radio wave reception level LB from the receiver unit 103 to determine the stability of the ongoing communication.

If the radio wave reception level LB coming from the receiver unit 103 drops below a predetermined level, the main controller 120 concludes that the wireless communication terminal 100 may have entered the cell of another base station. In that case, the main controller 120 causes the frequency synthesizer 105 to switch reception channels successively to search for base stations with their radio wave reception levels higher than the predetermined level.

If no stream data is being received, the main controller 120 causes the frequency synthesizer 105 to adjust to a frequency that allows the terminal to receive radio waves on the channel of the base station offering the highest radio wave reception level LB, whereby communication is reestablished properly.

If stream data is being received, the wireless communication terminal 100 searches for base stations which are emitting radio weaves at reception levels LB higher than the predetermined level and which are already distributing the stream data in question. That is to say, each candidate base station should satisfy two requirements: it should have a radio wave reception level LB higher than the predetermined level, and it should be in the process of delivering the target stream data.

The radio wave reception levels LB of base stations are detected by the receiver unit 103 with the frequency synthesizer 105 arranged to scan successively the radio waves from these base stations. Whether or not the desired stream data is being delivered by a given base station is determined by demodulating and decoding the radio waves from the received base station and checking to see if the acquired data contains information indicative of the stream data in question.

The main controller 120 then controls the frequency synthesizer 105 in such a manner as to select the communication channel of the base station which is currently distributing the target stream data and which has the highest of the detected radio wave reception levels LB in excess of the predetermined level. That is to say, even if a base station not distributing the stream data offers a radio wave reception level LB higher than that of any other base station, that station may not be selected; the receiver unit 103 has its signal reception frequency adjusted preferentially to the communication channel of a base station currently distributing the stream data in question.

As described, arrangements are made to avert as much as possible the need to establish a new flow of the stream data between the server and the base station into whose cell the wireless communication terminal has moved. This scheme is intended to improve the utilization efficiency of the wireless communication network 200.

[Processing Performed when the Terminal Moves from One Cell to Another During Stream Data Reception]

Figure 3:
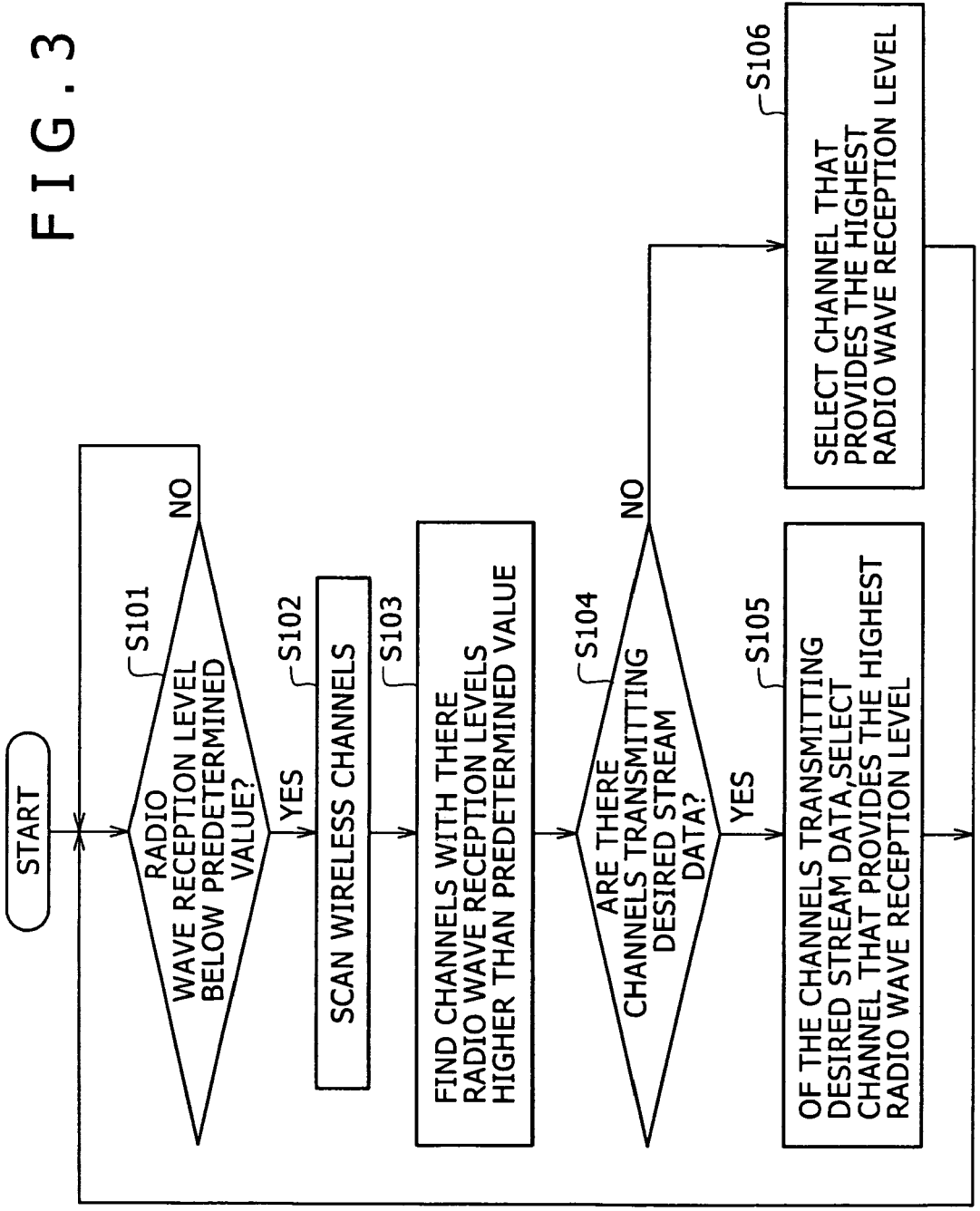
FIG. 3 is a flowchart of steps performed when the inventive wireless communication terminal moves from one cell to another.
Figure 4:
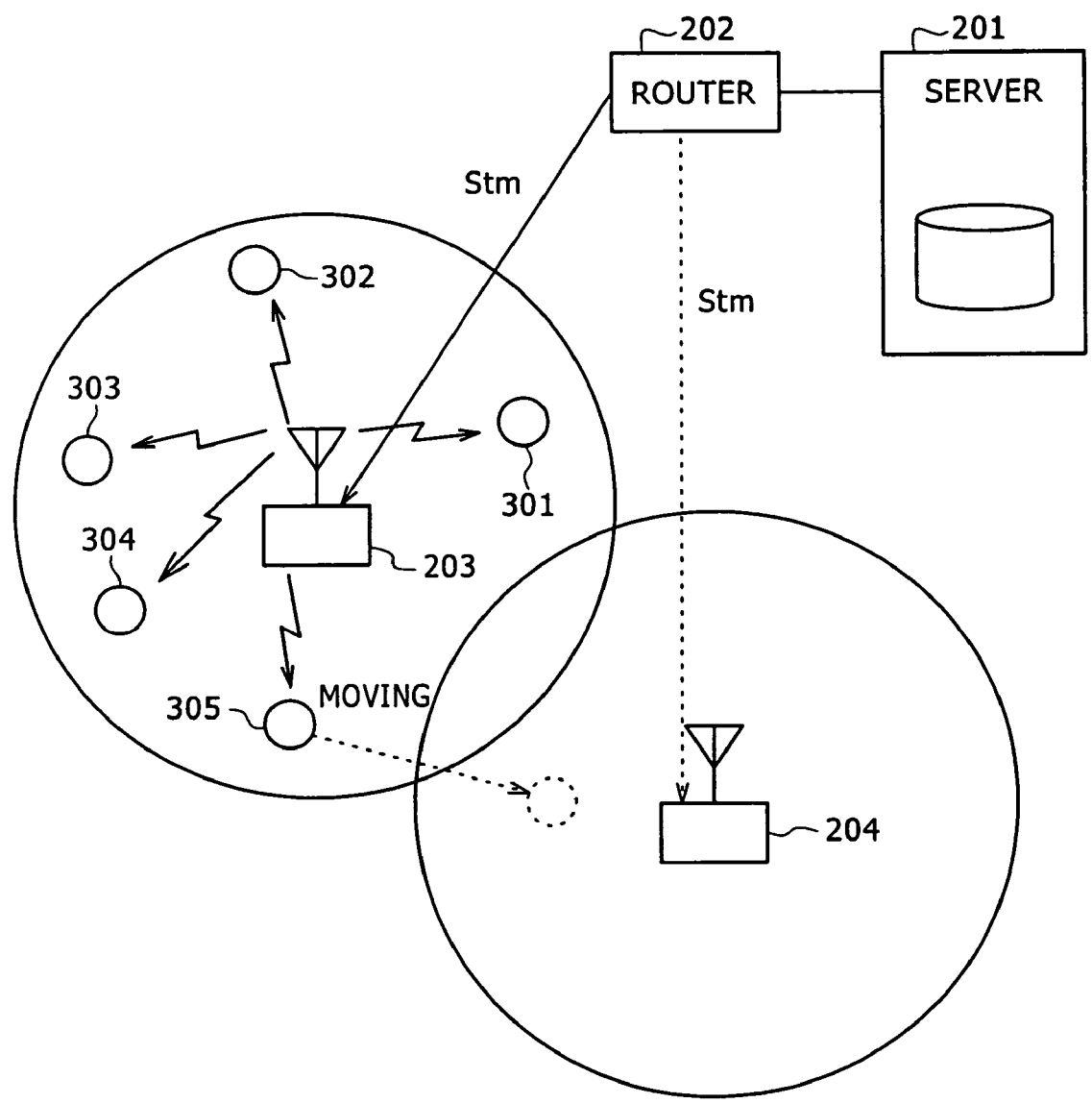
FIG. 4 is an explanatory view showing what takes place when a wireless connection terminal connected to a conventional wireless LAN network moves from one cell to another.

Described below with reference to the flowchart of FIG. 3 is a process made up of steps performed when the wireless communication terminal 100 moves from one cell to another while receiving stream data. The process is what takes place when the hand-over function is executed.

FIG. 3 outlines the steps carried out primarily by the main controller 120 executing its hand-over function while the wireless communication terminal 100 is receiving stream data for local use.

It is assumed that in the wireless communication terminal 100, the main controller 120 starts receiving the stream data constituting content of videos and sounds such as a movie. At this point, the main controller 120 starts the process shown in FIG. 3 in order to execute its hand-over function. The main controller 120 checks the radio wave reception level LB coming from the receiver unit 103 to determine whether the level LB has dropped below a predetermined level (step S101).

If in step S101 the radio wave reception level LB is not found below the predetermined level, there is no need to switch wireless channels. The main controller 120 then repeats step S101. If in step S101 the radio wave reception level LB is found below the predetermined level, it is highly probable that the wireless communication terminal 100 has moved into the cell of another base station. In that case, the main controller 120 scans wireless channels (step S102) to search for the channels with their radio wave reception levels LB higher than the predetermined level (step S103).

More specifically, in step S102, the main controller 120 causes the frequency synthesizer 105 to switch successively the reception frequencies given to the receiver unit 103 so that radio waves from a plurality of base stations in the vicinity may be captured. In step S103, the radio wave reception levels LB from the multiple base stations in the vicinity are acquired consecutively. The base stations (i.e., communication channels) whose radio wave reception levels are found higher than the predetermined level (i.e., offering good communication quality) are thus detected.

The main controller 120 checks to determine if, among the detected base stations (i.e., communication channels) with their radio wave reception levels found higher than the predetermined level in step S103, there are any base stations already distributing the target stream data (step S104).

More specifically, the check in step S104 involves demodulating and decoding the radio waves received successively from the base stations in the vicinity, and determining whether the received radio waves have added information indicative of the stream data in question.

In step S104, there may be found base stations (communication channel) which provide radio wave reception levels higher than the predetermined level and which are already distributing the stream data. In that case, the main controller 120 causes the frequency synthesizer 105 to let the receiver unit 103 select for reception the radio waves from the base station which is already distributing the target stream data and which has the highest of the detected radio wave reception levels LB in excess of the predetermined level. The selection is made by the receiver unit 103 switching successively the communication channels to choose from (step S105). After the selection, step S101 and subsequent steps are repeated.

Step S105 is a process that allows the receiver unit 103 in the wireless communication terminal 100 to switch the base stations (communication channels) selectively for radio wave reception. With an appropriate base station selected, there is no need for the wireless communication network 200 to establish a new flow of the stream data with that base station into whose cell the terminal has moved. The currently delivered stream data is then received continuously by the terminal from the selected base station without interruption.

In step S104, there may be found no base station (i.e., communication channel) already distributing the stream data at a radio wave reception level higher than the predetermined level. In such a case, the main controller 120 causes the frequency synthesizer 105 conventionally to let the receiver unit 103 scan channels and thereby select the base station that offers the highest radio wave reception level (step S106). Thereafter, step S101 and subsequent steps are repeated.

More specifically, in step S106, the desired stream data is not found currently distributed by any of the base stations whose reception levels are high enough for good reception. This prompts high-layer protocols to initiate conventional mobile communication procedures causing the destination base station to start transmitting the target stream data, whereby a new flow of the stream data is established between the moving terminal and the newly connected base station. Still, the wireless communication network 200 creates the new data flow without interrupting the ongoing delivery of the stream data in question.

In the manner described above, the inventive wireless communication terminal 100 on the move has its choice between two base stations: a first station which is already delivering the target stream data and which offers a radio wave reception level somewhat low but high enough to ensure good quality of communication, and a second station which provides a radio wave reception level higher than that of the first station but which currently is not delivering the stream data in question. The wireless communication terminal 100 selects the first base station despite its somewhat low radio wave reception level.

The above arrangements allow the wireless communication network 200 to enhance its overall efficiency of communication. Large quantities of video and audio data are distributed without interruption and received by each wireless communication terminal on the network for real-time reproduction and local use.

This invention has been discussed primarily in conjunction with the wireless communication terminal embodying the invention. The inventive terminal is representative of diverse kinds of wireless communication-capable equipment such as PDA's (Personal Digital Assistants) having communication facilities, laptop personal computers capable of communication (so-called mobile computers), and other communication-capable devices.

The wireless communication network is not limited to any of the networks based on wireless LAN or IP multicast technology. According to the invention, the network can be any one of diverse networks to which various wireless communication terminals are connected to send and receive information in packets.

According to the invention, the data distributed through base stations is not limited to the stream data made up of video and audio data. The invention also applies when the data is constituted by large quantities of numeric data such as mesh data for use in real-time weather forecast, by mass text data for use in offering text-based news in real time, or by other diverse kinds of mass data distributed continuously.

The invention also applies either when a server sends mass data continuously to a base station from which the data is delivered to a client (i.e., wireless communication terminal) in synchronism with the client's buffer capacity being monitored, or when the server simply outputs mass data asynchronously. That is to say, the invention applies to diverse data delivery setups whereby mass data is distributed continuously.

As described and according to the invention, each mobile communication terminal getting radio waves from a plurality of base stations is arranged to select an optimum base station from among them in terms of the availability of desired stream data and the quality of data reception. The inventive arrangements help boost the utilization efficiency of the network over its wireless segments, whereby communications of higher quality than ever before are ensured.

The invention claimed is:

1. A wireless communication terminal comprising:
   selecting means for selecting a first base station with which to communicate;
   detecting means for detecting a radio wave reception level of the first base station selected by said selecting means; and
   selection controlling means which, if the detected radio wave reception level from said detecting means drops below a predetermined level during reception of predetermined data, then causes said selecting means preferentially to select a second base station which is already broadcasting said predetermined data to a plurality of wireless communication terminal within a cell of said second base station and which offers a radio wave reception level higher than said predetermined level, based on the radio wave reception level of each base station selected and on the ongoing broadcasting of said predetermined data therefrom;
   wherein said predetermined data is at least one of video streaming data and audio streaming data which is being multicast to the terminal from at least said first base station and said second base station.

2. A wireless communication method for causing predetermined data to be streamed to a terminal from a network of base stations, said wireless communication method comprising the steps of:

selecting a first base station with which to communicate;

detecting a radio wave reception level of the first base station selected by said selecting means; and if a radio wave reception level of said first base stations drops below a predetermined level, then selecting preferentially a second base station which is already broadcasting predetermined data to a plurality of wireless communication terminal within a cell of said second base station and which offers a radio wave reception level higher than said predetermined level, based on the radio wave reception level of each base station selected and on the ongoing broadcasting of said predetermined data therefrom;

wherein said predetermined data is at least one of video streaming data and audio streaming data which is being multicast to the terminal from at least said first base station and said second base station.

* * * * *